United States Patent [19]

Wood

[11] Patent Number: 4,977,661

[45] Date of Patent: Dec. 18, 1990

[54] CARRIER BEARING AND AXLE BEARING PULLER

[76] Inventor: Thomas H. Wood, 3008 W. 5650 S., Roy, Utah 84067

[21] Appl. No.: 390,534

[22] Filed: Aug. 7, 1989

[51] Int. Cl.[5] .............................................. B23P 19/04

[52] U.S. Cl. ...................................................... 29/261

[58] Field of Search ................................. 29/261-265, 29/255, 280, 282

[56] References Cited

U.S. PATENT DOCUMENTS

| | | | |
|---|---|---|---|
| 1,435,278 | 11/1922 | Campbell | 29/263 |
| 1,473,075 | 11/1923 | Bates | 29/261 |
| 1,782,037 | 11/1930 | Grebenstein | 29/261 |
| 3,304,601 | 2/1967 | Torres | 29/261 |
| 4,174,558 | 11/1979 | Dombrowski | 29/264 |
| 4,624,041 | 11/1986 | Gathright et al. | 29/263 |
| 4,682,395 | 7/1987 | Klann | 29/261 |

*Primary Examiner*—Robert C. Watson
*Attorney, Agent, or Firm*—Trask, Britt & Rossa

[57] ABSTRACT

An apparatus for removing carrier bearings, axle bearings, or other types of bearings from a support shaft is disclosed. The apparatus includes a pair of housing sections pivotedly mounted as a controllably positioned platform. The platform defines an aperture therein, through which passes a drive shaft. Each housing section defines a lip on its free end adapted to engage the race of a bearing to be removed. Upon the imposition of a force on a bearing's support shaft by the drive shaft, the housing section lips apply a force against the bearing, eventually disengaging it from its mounting on the axle.

15 Claims, 9 Drawing Sheets

CARRIER BEARING AND AXLE BEARING PULLER

BACKGROUND OF THE INVENTION

1. Field

This invention relates to tools used in grasping and removing articles. More specifically, the invention is directed to apparatus adapted for removing carrier bearings, axle bearings or other types of bearings, from a support shaft.

2. Statement of the Art

Various mechanical structures utilize bearings retained on support shafts in their construction. For example, in automobiles and trucks, shaft-mounted bearings may be utilized in sections of the drive line, on the axle, or in the transmission. Recognizing that bearings are typically utilized in environments wherein movement, especially rotation, is occurring, it becomes apparent that after extended use, oftentimes these bearings must be renewed. The problems presented by replacing such bearings are well known. Conventionally, several attempts have been made in providing devices adapted for removing bearings from their support shafts.

Initially suggested removal techniques involved the use of a hammer and punch. In this method, the individual attempted to intentionally fragment the bearing races and thereby detach the bearing from its support mount. Understandably, the danger of flying bearing fragments, typically produced by this technique, seriously compromises the safety of the individual practicing the technique.

A second method involved the use of a cutting torch to disassemble or cut the bearing, thereby facilitating its removal. This technique presented problems in that the heat of the torch oftentimes led to damage to the support shaft, most notably a distortion or deformation of that shaft.

A third method involves the use of a split bearing puller construction which is removed by means of applying pressure thereto by use of a hydraulic press. The approach is considered unsafe in view of the possibility of the bearing's fragmentation due to the forces being applied thereto by the hydraulic press. Further, the technique is time consuming in its application.

In a fourth approach, jaw-like pullers have been suggested. Further, the uneven force applications to the bearing resultant under this approach often distort or deform the bearing such that instead of removing it from its support shaft, the jaw pullers actually tighten the bearing on its shaft.

Other tools of various configurations also have been suggested. Among those advanced is the device disclosed in U.S. Pat. No. 3,763,539 (Dodd) which provides a structure adapted to spread the inner and outer races of a bearing to permit a threaded force application member to apply a linear force to individual ball bearings positioned between the races to thereby extract those ball bearings.

U.S. Pat. No. 4,034,458 (Ford et al.) discloses a bearing removal tool which includes a reaction housing having a plurality of lifter bars mounted on a lifting plate mounted to be displaceable vis-a-vis the housing. The lifting bars are configured to be inserted between the inner and outer races of a bearing to be removed. A force application member abuts against the reaction housing and is threadedly inserted through the lifting plate. Upon the force application member's rotation, the lifting plate is displaced from the reaction housing. The reaction housing provides a base, as the lifting members, being displaced away therefrom, extract the bearing with which they are engaged.

Claps in U.S. Pat. No. 2,618,053 and Savastano in U.S. Pat. No. 3,340,593 disclose a split sleeve bearing puller which provides a centrally positioned, displaceable drive shaft. Savastano's device includes a shaft having an enlarged end section. In both devices, a pair of split half sections encase a length of the drive shaft. The shaft and the half section are made insertable into the central aperture of a bearing and thereafter are displaced as the shaft urges the split sections outwardly. The sections are forced into engagement with the bearing and upon an upward displacement of the shaft, the tool displaces the bearing upwards from its mounting.

In view of these prior attempts, there continues to be a need for apparatus which can efficiently remove a bearing, such as a carrier or axle bearing from its support shaft, while minimizing the possibility of explosion-like fragmentation of the bearing, a distortion of the support shaft and the resultant danger to the user.

SUMMARY OF THE INVENTION

A carrier bearing puller assembly for removing a bearing, from its support shaft is disclosed. The puller assembly is adapted for circumferentially engaging the outer race of the subject bearing and applying a disengaging force uniformly over substantially the entire outer circumference of the bearing. The structure of the assembly permits its use in a variety of environments, e.g. bearings mounted on shafts of different lengths and bearings having various diameters. The assembly further provides an encasement structure which, in large part, contributes to protecting the user and bystander in the event that the bearing fragments during its removal.

The puller assembly includes a pair of matched, hollow housing sections or sleeves mounted for pivoted rotation about a platform positioned therebetween. The platform is fitted with a force application means adapted for directing a force against the support shaft of the bearing to be removed. As that force is applied, a reaction force is generated on the platform and in turn on the housing sections mounted to the platform. The lower ends of the two housing sections define a lip thereon, dimensioned to be inserted beneath the subject bearing and engage the circumference of that bearing. A retention means, such as an annular ring, is thereafter mounted on the closed housing sections to retain them in position. The housing sections may be retained in engagement with the central platform by a secondary retention means, which structurally may be an elastic "O"-ring.

The housing sections may define a window therein, to provide a means for the user to align the force application means with the bearing support shaft.

Upon an application of force to the support shaft by the force application means, the rotation force on the platform causes the housing sections to be urged upwardly, applying a disengaging force uniformly about the lower circumference of the bearing. Should the bearing fragment during removal, the housing sections provide a degree of protection to the user, as they hinder, if not preclude, the egress of any fragments from within the hollow interior space defined by the associating housing sections.

The puller assembly may be fitted with an extension tube which provides a means of accommodating longer support shaft lengths.

DETAILED DESCRIPTION OF THE DRAWINGS

Figure 1:
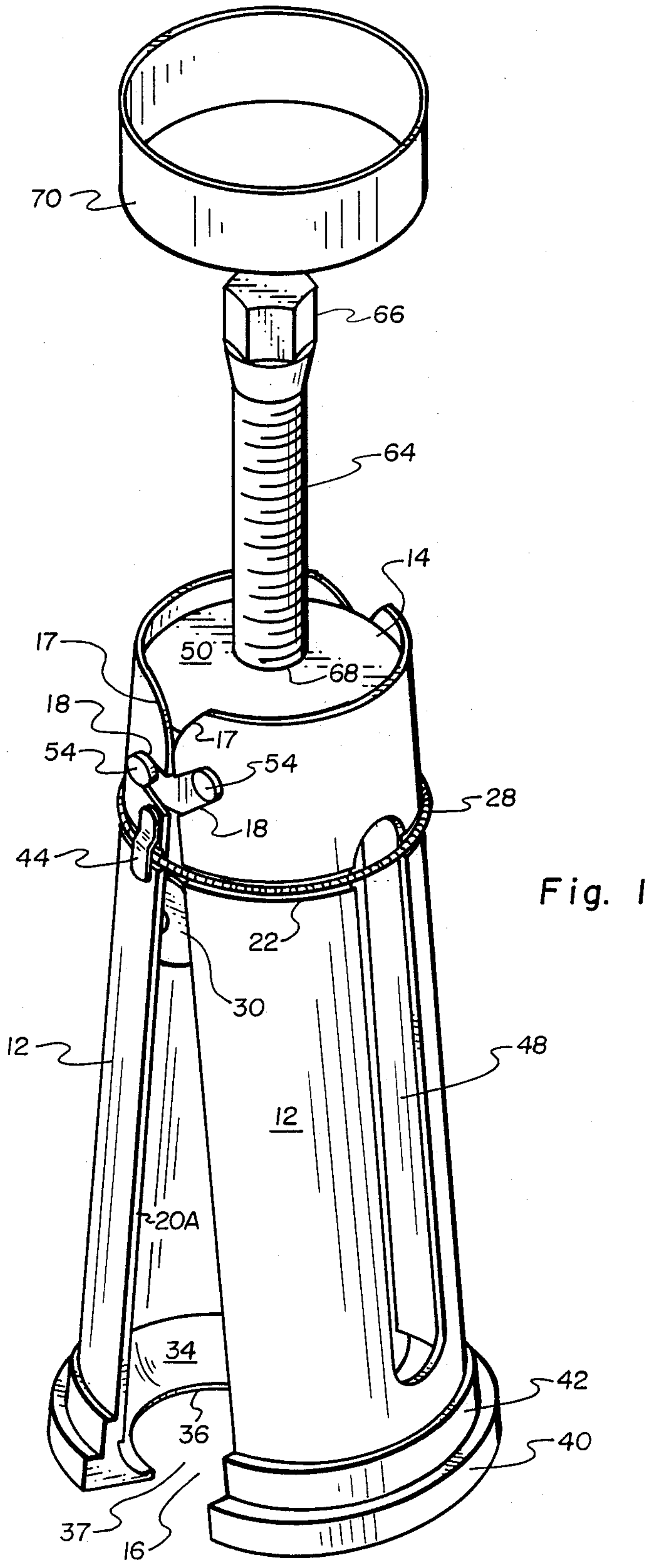
FIG. 1 is a perspective view of a carrier bearing puller assembly of the invention having its retainer ring removed from engagement with the housing sections.
Figure 2:
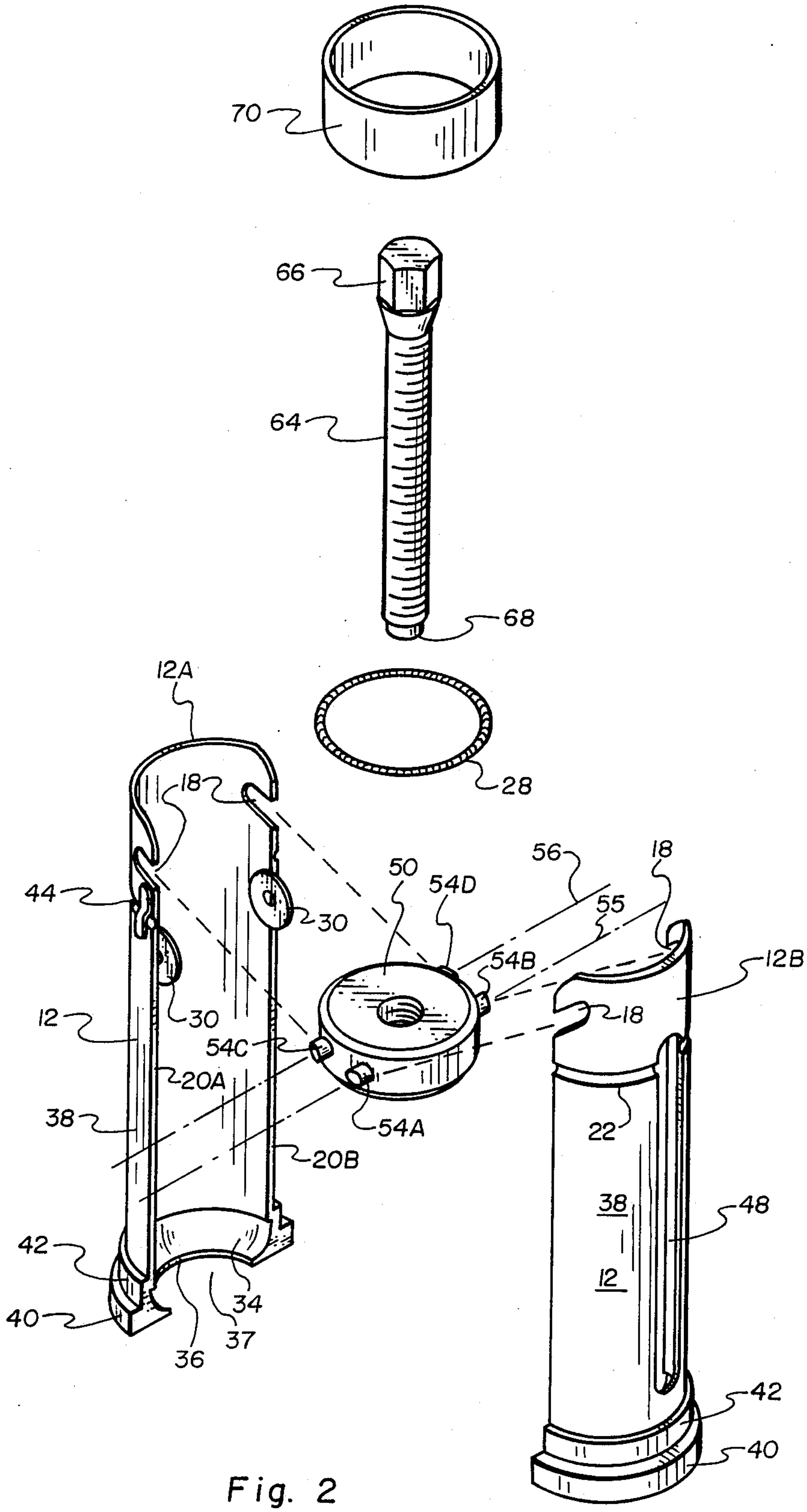
FIG. 2 is an exploded view of the bearing puller assembly of FIG. 1 showing the various components of the puller.
Figure 3:
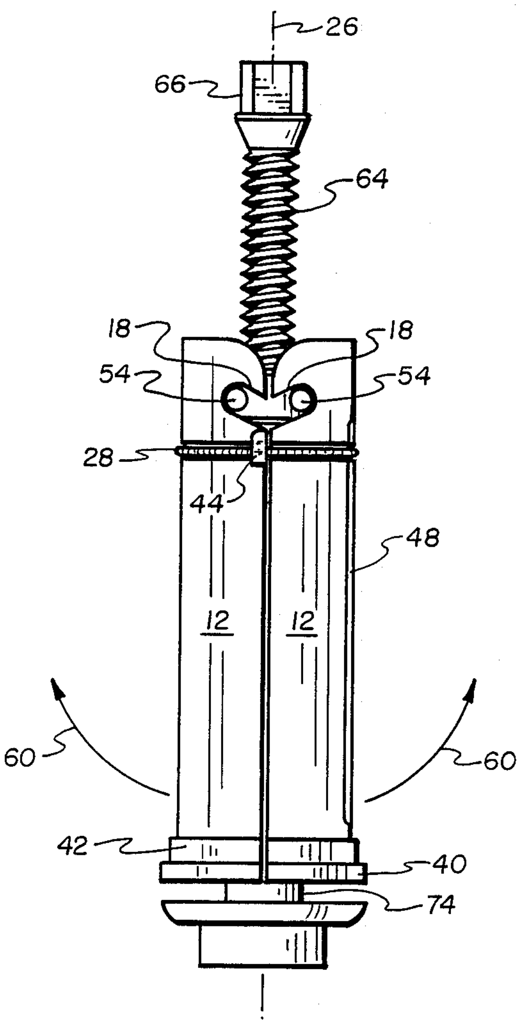
FIG. 3 is an elevational side view of the bearing puller assembly.

A carrier bearing puller assembly of the invention is shown to advantage in FIGS. 1–2. As shown, the assembly includes a pair of matched, generally semi-cylindrical housings sections or sleeves 12 each having an open top end 14 and a substantially open bottom end 16. The top 14 of each housing section 12 defines two curved edges 17 positioned opposite one another. The radius of curvature of each edge is adapted to provide sufficient relief for the rotation of each housing section without collision with an opposingly mounted housing section. FIG. 2 illustrates the housings as each having a generally "U"-shaped cross-section which remains substantially constant in configuration along the entire height of housing section 12. Each housing section 12 defines a pair of angulatedly positioned, elongate slots 18 positioned substantially on opposing sides of the housing section 12. Each slot 18 communicates with the upstanding edge of its housing section 12 and extends upwardly along the upright sidewall of the housing section 12, eventually terminating in a generally semicircular configured end. When the two housing sections are positioned contiguous one another, as shown in FIG. 3, each slot 18 registers or aligns with a respective slot 18 of the opposing housing section 12 to form a generally "V"-shaped slot. The two "V"-shaped slots formed by an association of the housing sections 12 are positioned diametrically opposite from one another about the generally circular cross-section of the upright cylinder formed by the associated housing sections 12.

Positioned elevationally below the slots 18 of each housing section 12 is a generally "U"-shaped cross-sectioned annular channel 22 which extends continuously from one upright edge 20A of the housing to the opposing upright edge 20B. With the exception of its being interrupted at one point by an elongate vertically oriented slot 24, each channel 22 extends continuously between the upright edges 20A and 20B of its respective housing section. The channel 22 is positioned generally in a plane which is oriented orthogonally to the vertical axis 26 of the puller assembly. As shown in FIG. 3, when the two housing sections are assembled together, the two channels 22 are aligned one with another to form a generally circular channel which substantially encircles the exterior surface of the two associated housing sections 12. The channels 22 are dimensioned to receive a circular-shaped, flexible elastic "O"-ring 28 which is dimensioned to be received within the channels 22 and exert a retaining force on the two housing sections 12, thereby urging those housing sections 12 to retain the orientation shown in FIG. 3. The elastic "O"-ring 28 may be fabricated from rubber or other flexible material.

Mounted on one of the housing sections 12 is a pair of substantially oppositely positioned extensions 30. As shown in FIG. 2, these extensions 30 are mounted below the channel 22 and proximate the opposing upright edges 20A and 20B. As illustrated in FIG. 2, each of these extensions has a generally circular disk appearance and is mounted such that approximately one-half of the disk extends outwardly beyond its respective housing section edge 20A and 20B. Each extension is configured to have a radius of curvature corresponding to that of the inner wall of its housing section 12. When the two housing sections 12 are associated, as shown to advantage in FIG. 1, the extensions 30 form a means of aligning the two housing sections 12 as they are brought into abutment. In the operational orientation shown in FIG. 4, the extensions operate to hinder, if not preclude, any laterally directed disassociation of the assembled housing sections 12, i.e., along the direction indicated by arrows 32.

Positioned on the lower end 16 of each housing section 12 is a downwardly and inwardly sloping semicircularly-shaped lip 34. As shown to advantage in FIG. 3, the lip 34 begins at a common elevation on the inner sidewall of each housing section 12 and slopes downwardly to a thin, generally semicircular-shaped edge 36. When the two housing sections are assembled as in FIG. 3, the two aligned edges 36 define a circular aperture or port 37 in the bottom endwall of the assembly.

Mounted on the exterior sidewall 38 of each housing section 12 is a first, generally semicircular upstanding lip 40 which forms part of the bottom endwall of the assembly. A second semicircular lip 42 having a radius smaller than that of the first lip 40 is mounted on the upright exterior sidewall surface of each housing section above and atop the first lip 40. Both lips 40 and 42 have a radius larger than the housing section 12 on which they are mounted.

In manufacture, each of the housing sections 12 together with their associated lips 40 and 42 may be manufactured as an integral unit.

Mounted on the exterior sidewall of at least one housing section 12 is a vertically mounted retention bracket 44. As shown, bracket 44 is mounted over the channel 28 thereby to retain an "O"-ring 28 within its channels 22. The bracket 44 includes a lip-like extension 46 which is positioned spacedly above the housing section sidewall whereby the "O"-ring 28 may be passed between the lip 46 and the sidewall and thereafter positioned within the channel 22. As the housing sections 12 pivot outwardly as shown in FIG. 1, the bracket precludes the "O"-ring 28 from leaving its channel and being urged upwardly along the height of the housing sections 12.

One of the housing sections 12, namely the section identified as section 12B, defines an elongate slot or window 48 oriented vertically upright in the sidewall of the housing. Window 48 extends from a location proximate the channel 22 downward to a location proximate the upper lip 42. The window 48 permits the user to view the hollow interior of the assembly formed by the association of the two housing sections 12.

Mounted proximate the upper ends 14 of the housing section assembly and positioned between the opposing sections 12 is a circular disk platform 50. This platform 50 is sized to be received within the open end of the associated pair of housing sections 12. The platform 50 defines a circular, female thread-fitted aperture 52 at the central region thereof. As shown, the aperture 52 is oriented vertically and extends through the entire thickness of the platform 50. A pair of lateral, outwardly extending shafts 54 are mounted on each side of the platform 50. In each pair of shafts 54, the shafts 54 are mounted spacedly apart from one another. Each shaft 54 is positioned to register with a respective slot 18.

One shaft 54 in each pair of shafts 54 is oriented collinear with a respective shaft 54 in the other pair of shafts 54. As shown in FIG. 2, shaft 54A is oriented collinear with shaft 54B along axis 55 and shaft 54C is oriented collinear with shaft 54D along axis 56. Axis 55 is oriented parallel to axis 56. The shafts 54A and 54B form an axle or pivot axis for housing section 12B, for rotation thereabout as shown by arrow 60 in FIG. 3. The shafts 54C and 54D form an axle or pivot axis for housing section 12A for rotation thereabout as shown by arrow 62 in FIG. 3.

An elongate male threaded bolt 64 is threadingly inserted into aperture 52. Bolt 64 includes a polygonally shaped head 66 configured to be grasped and rotated by an end wrench, socket wrench, power wrench, or other similar device. The end 68 of the bolt 64 is configured to abut against the axle or support shaft 74 of the carrier bearing to be removed.

An annular retention ring 70 is configured to be slidable along the height of the housing section assembly, i.e. placed over the top of the housing section assembly and be slid downwardly along the assembly. The ring 70 is configured to rest atop the aligned pair of lips 42. When in place atop the lips 42, the ring 70 functions to physically restrain the separation of the two housing sections 12.

Figure 4:
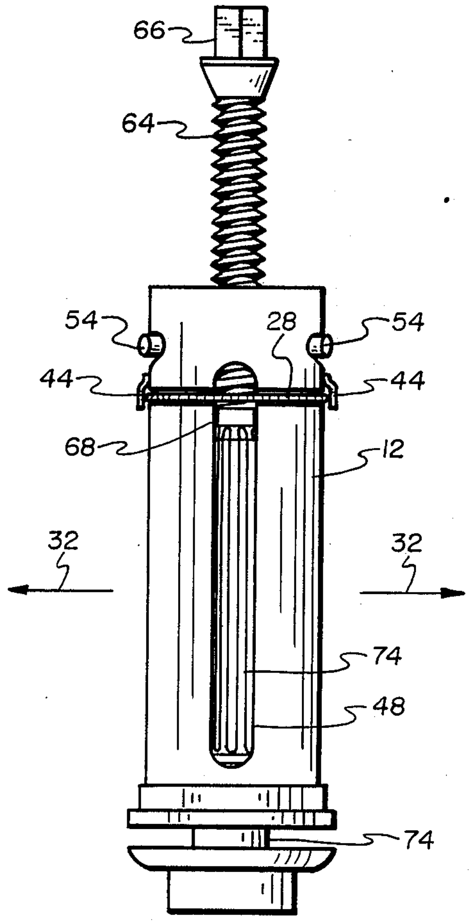
FIG. 4 is an elevational side view of the bearing puller assembly of FIG. 3 rotated ninety degrees (90°) about a vertical axis.
Figure 5:
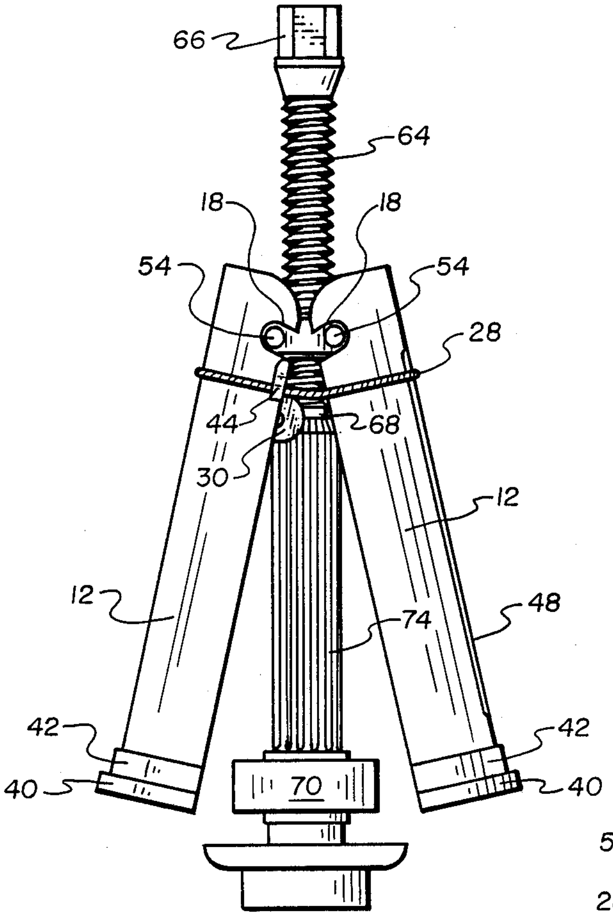
FIG. 5 is an elevational side view of the bearing puller assembly of FIG. 3 having the two housing sections pivoted about their respective pivot axes.
Figure 6:
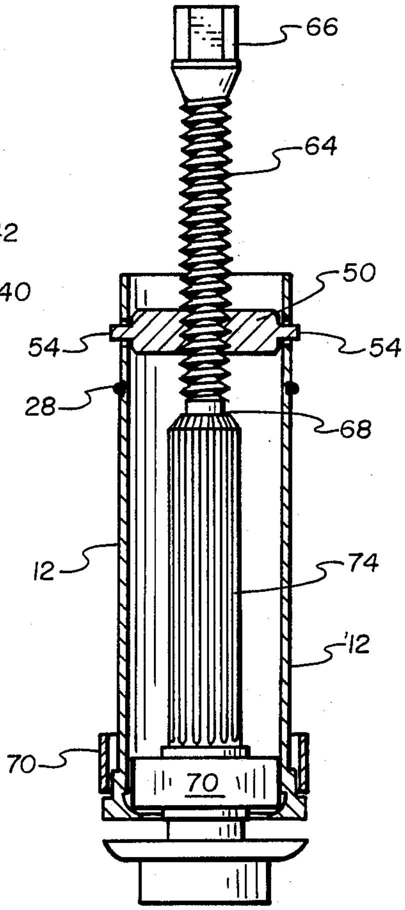
FIG. 6 is a cross-sectional side view of the bearing puller assembly of FIG. 4.
Figure 9:
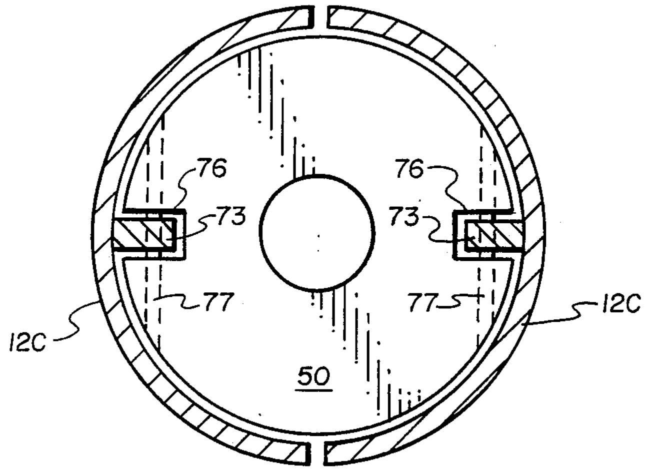
FIG. 9 is a top view of a first alternative bearing puller assembly utilizing housing sections of the type shown in FIG. 7.

FIGS. 5 and 6 illustrate the installation of the bearing puller assembly on a carrier bearing to be pulled. In order to pull a carrier bearing 72 from its support shaft 74, the assembly shown in FIG. 5, namely the two housing sections 12, the member 50, the "O"-ring 28 and the bolt 64, is opened, i.e., the two housing sections 12 are pivotedly rotated about their respective pivot axis, swinging the lower ends 16 of the housing sections outward. With housing sections being retained in the open position, the assembly is placed atop the support shaft 74 whereby the lower end of that bolt abuts against the shaft 74. The housing sections 12 are urged toward one another by the stretched "O"-ring. The sections 12 are then closed about the shaft 74 and carrier bearing 72. As the sections 12 close, the lips 34 are positioned below the bearing 72 as shown to advantage in FIG. 6. Upon the complete closing of the housing sections 12, the retaining ring 70 is slid down over the housing sections 12 and positioned atop the upper lip 42. Thereafter, a clockwise rotation of bolt 64 causes the housing sections 12 to be urged upwardly. The abutment of the bolt 64 against shaft 74 precludes any further downward displacement of bolt 64. As the housing sections 12 are urged upwardly, the lip engages against the bottom surface of the carrier bearing 70 and exerts an upwardly directed force on that bearing 72. This force application occurs over substantially the entire perimeter or circumference of the bearing 72. As shown in FIG. 4, the window 48 permits the user to verify the abutment of the bolt 64 on the top of shaft 74.

The structure of the housing sections 12 defines a generally solid wall enclosure about the bearing 72 and its support mounting, and thereby functions as a containment vessel substantially to confine debris and shrapnel in the event that during the removal process the bearing 72 should rupture under the forces being applied thereto.

FIGS. 7, 10, 11 and 12 illustrate alternative housing section constructions.

Figure 7:
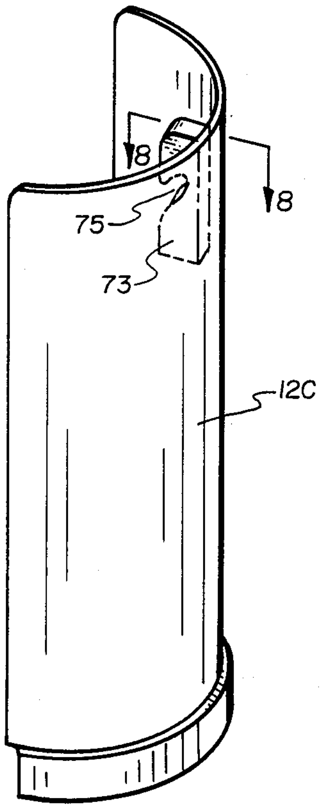
FIG. 7 is an elevated perspective view of a first alternative housing section construction.
Figure 8:
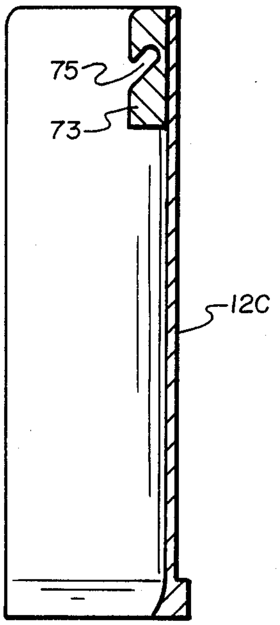
FIG. 8 is a cross-sectional side view of the housing section of FIG. 7 taken along sectional lines 8—8.

In FIGS. 7 and 8, the housing section 12C illustrated is substantially similar to housing section 12 shown in FIG. 1 with the exception that the slots 18 have been eliminated. Further, a hinge bracket 73 is mounted on the interior sidewall of the housing 12 in an upright vertical orientation. As shown, the bracket 73 is positioned substantially centrally to the interior sidewall between the opposing upright edges of the housing. Bracket 73 defines an upwardly angulated slot 75 therein which extends through the bracket. In a bearing puller assembly utilizing the housing sections of the type shown in FIGS. 7 and 8, the platform 50 is configured to define two diametrically opposing, radially-positioned slots 76. Slots 75 are dimensioned to slidably receive a respective bracket 73. An elongate axle 77 is mounted within the platform 50 so as to extend through a respective slot 76 and through a respective slot 75. Axle 77 forms an axis about which the housing section 12C may rotate.

In this construction, the interaction of the slots 76, brackets 73 and axles 77 function to restrain each housing section 12C vis-a-vis the platform 50 sufficiently to eliminate the need for the channels 22 "O"-ring 28 and extensions 30.

Figure 10:
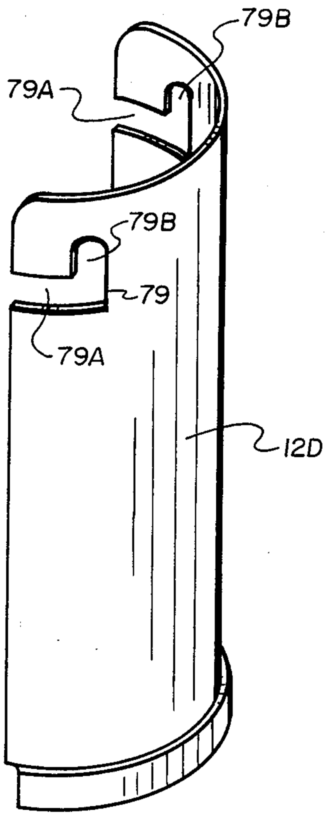
FIG. 10 is a perspective view of a second alternative housing section construction.

FIG. 10 illustrates a housing section 12D which approximates the structure of housing section 12 of FIG. 1. The housing section 12D defines "L"-shaped slot 79 instead of the angulated slots 18. Each slot 79 is configured to receive its respective pin 54 within the laterally extending linear section 79A of the slot 79 and thereafter the pin 54 is received in the upwardly extending section 79B of the slot 79. The pin 54 resides generally in slot section 79B during the operation of the assembly. Similar to the housing 12C of FIGS. 7 and 8, the housing section 12D likewise provides sufficient stability to the bearing puller assembly such that the need for channels 22, "O"-ring 28 and extensions 30 is eliminated.

Figure 11:
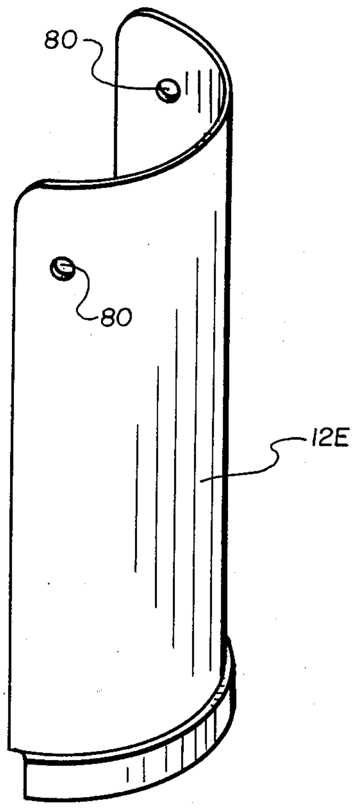
FIG. 11 is a perspective view of a third alternative housing section construction.

FIG. 11 illustrates a housing section 12E which is structurally similar to housing section 12 of FIG. 1 with the exception that the slot 18 has been replaced by a pair of oppositely disposed circular apertures 80 which are dimensioned to respectively receive a pin 54 mounted to extend outwardly from platform 50.

Figure 12:
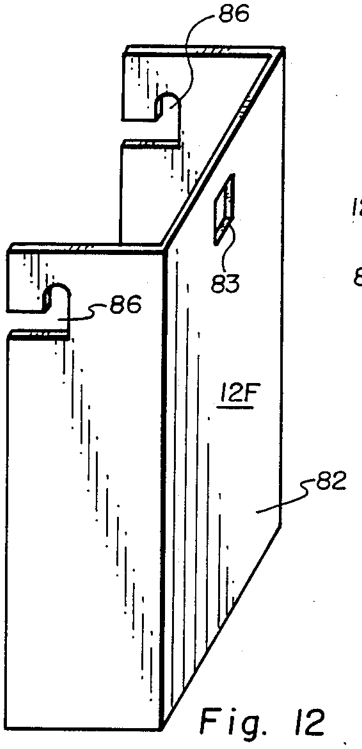
FIG. 12 is a perspective view of a fourth alternative housing section construction.
Figure 13:
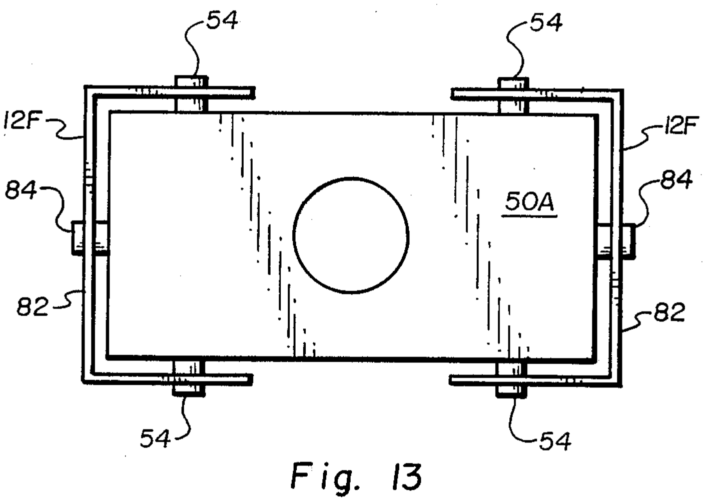
FIG. 13 is a top view of a bearing puller assembly utilizing housing sections of the type shown in FIG. 12.
Figure 14:
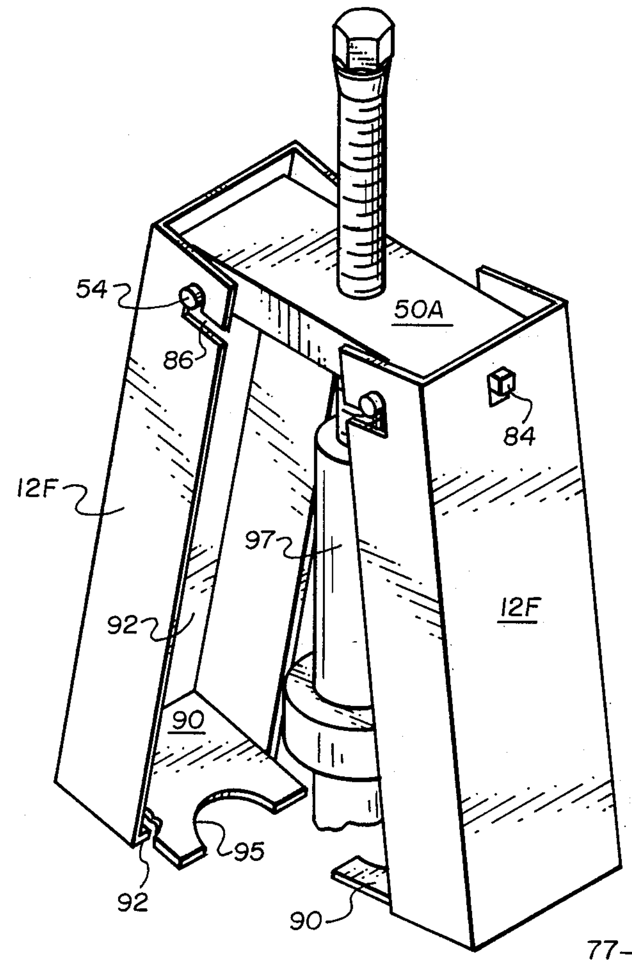
FIG. 14 is a perspective view of the bearing puller assembly shown in FIG. 13.
Figure 15:
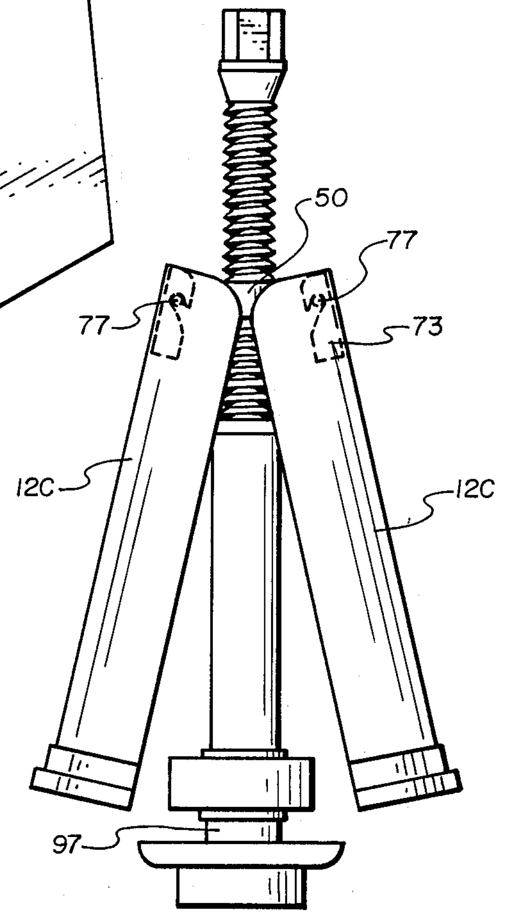
FIG. 15 is a side view of a bearing puller assembly having housing sections of the type shown in FIG. 7.

FIGS. 12–14 illustrate an embodiment of a bearing assembly puller wherein each housing section 12F is a generally box-shaped member having three planar sides, each side being mounted orthogonally to a contiguously oriented adjacent side. As shown in FIGS. 12–14, the central panel 82 defines an aperture 83 therein positioned and dimensioned to receive an elongate pin or extension 84 mounted on an end of a rectangularly shaped platform 50A. Extensions 84, which are depicted as rectangularly cross-sectioned shafts, extend essentially collinearly outwardly from the opposing ends of the platform 50A. The extensions 84 act as a guide means for directing their respective housing sections into a predetermined closed relationship about a bearing to be removed from its support shaft. Each of the side panel slots 86 are similar in both shape and function to those described in reference to FIG. 10.

FIG. 14 also illustrates a pair of removable abutment plates 90 mounted over and atop the inwardly extending flanges 92 located on the lower ends of each housing section 12F. As shown, each plate 90 is essentially a flat planar member having a substantially rectangular configuration. Each plate 90 is dimensioned to be received within the channel 92 defined within its respective housing section 12F and rest atop the flange 92. The edge 95 of each plate is configured to receive the support shaft of the bearing to be removed. As shown in FIG. 14, edge 95 has been configured to define a half-circular aperture dimensioned to receive one-half of an upright cylindrical support shaft 97.

The invention includes the use of a multiplicity of abutment plates 90 dimensioned to accommodate various sized support shafts 97 and bearings 98. The construction of the housing sections permits a user to easily remove a previously used pair of abutment plates 90 from the channel 92 and insert a new pair of plates 90 configured for receiving a different sized support shaft and engaging a different sized bearing.

In contrast to the previously illustrated embodiments wherein the arrangement of the housing sections and platform was adapted to provide for abutment of the opposing housing sections one against another in the closed position about the bearing and support shaft, the embodiment of FIG. 14 provides for a pair of housing sections which are positioned spacedly apart even in their closed orientation. In the operation of this embodiment the edges 95 of the opposing plates 90 contact one another and provide sufficient strength for the pulling operation of the assembly.

Figure 16:
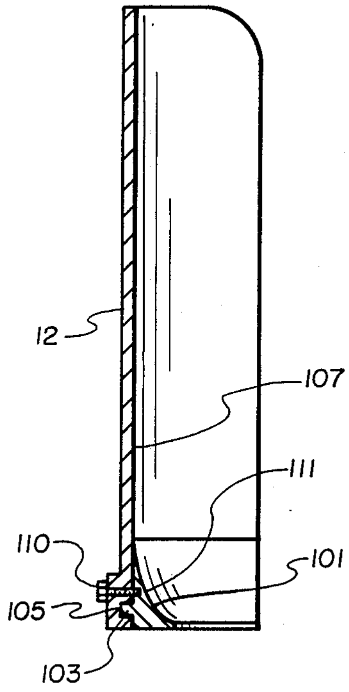
FIG. 16 is a side view of a housing section fitted with a removable lower interior flange plate.
Figure 17:
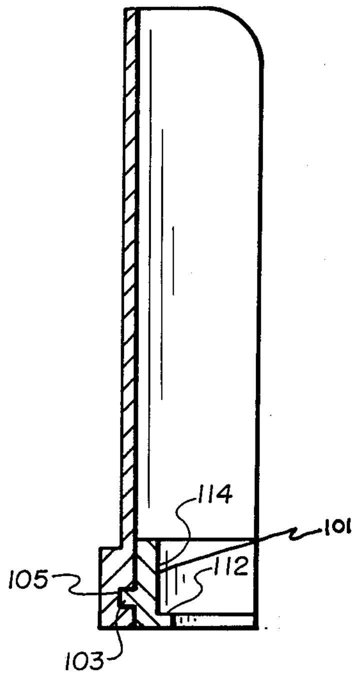
FIG. 17 is a side view of a housing section having an alternative embodiment of a lower interior flange plate.

FIGS. 16 and 17 illustrate a modification of the removable lower engagement lip construction. The housing section structures of FIGS. 16 and 17 are half cylindrical in configuration. Instead of using an inwardly extending flange 92 to support a removable abutment plate 90, these constructions utilize a one-piece, semi-annular lip 101 which is detachably mounted to the upright inner sidewall of the sections 12. As shown in FIG. 16, the lip 101 may include a first extension 103 which is dimensioned to be received into an annular recess channel 105 defined within the inner sidewall 107 of housing section 12. A threaded screw or bolt 110 extends through the housing section 12 and secures the lip 101 in place. As shown, the lip 101 may include a curved abutment surface 111 configured to engage the underside of a bearing to be removed.

FIG. 17 illustrates a removable lip 101 having only a finger extension 103 and recess channel 105 arrangement for securing the lip in position. In this construction, the abutment surface is formed by a horizontally-extending, basically planar base surface 112 which intersects an upstanding semicircular ring-like member 114.

Figure 18:
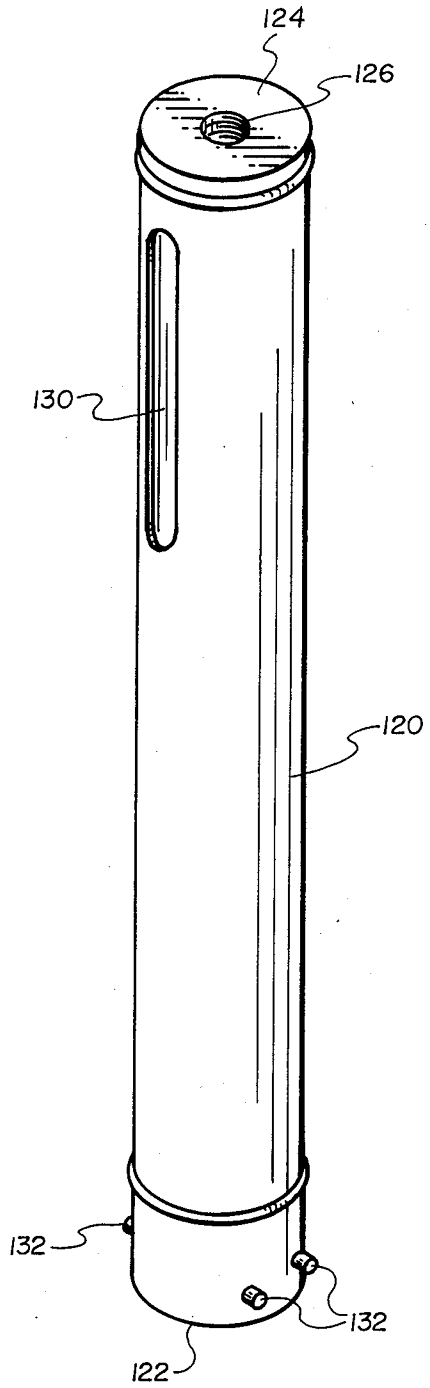
FIG. 18 is a perspective view of a puller extension assembly adapted for use with the bearing puller assembly of FIG. 3.

FIG. 18 illustrates an elongate extension or tube 120 adapted for providing the puller assembly with the capability of servicing bearing mountings on support shafts having extended lengths. As shown, the extension 120 is a hollow right cylindrically-shaped member having an open end 122 and a solid planar disk endwall 124. The endwall 124 is fixedly mounted on the top end of the extension 120. The endwall defines a centrally positioned, female thread-fitted aperture 126 therein adapted to receive the male threaded bolt 64. The extension 120 defines an elongate slot-like window 130 positioned vertically upright to permit the user's vision of the engagement of the drive bolt 64 and the carrier bearing support shaft 47.

Mounted proximate the lower end of the extension 120 are two pairs of outwardly extending pivot shafts or axles 132 which structurally and functionally are identical to those described above as shafts 54.

Figure 19:
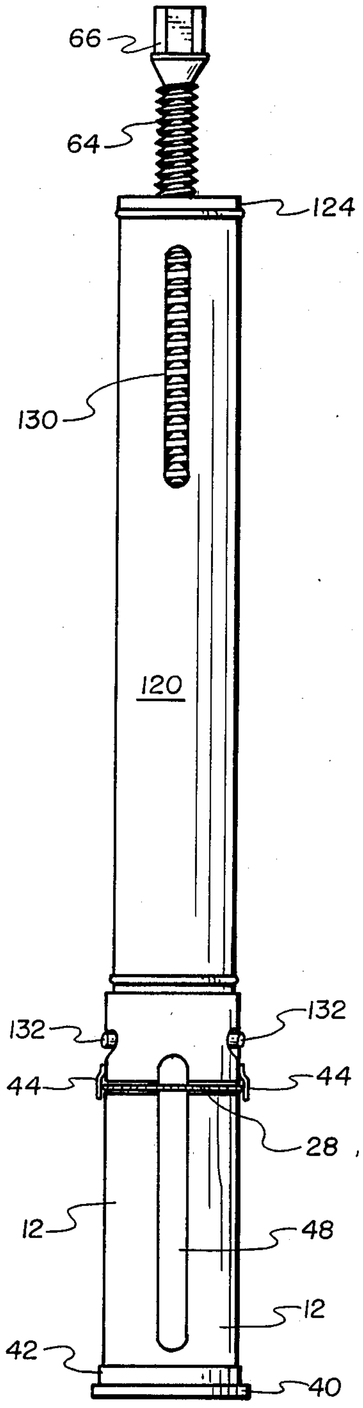
FIG. 19 is a side view of the extension shown in FIG. 18 mounted atop a bearing puller assembly of FIG. 4.

FIG. 19 illustrates the mounting of the housing sections 12 on the extension 120. In large part, the extension 120 operates similarly to platform member 50. While platform 50 essentially limits the height of a serviceable support shaft 94 to a shaft 97 having a height less than the height of the housing sections 12, the use of the extension 120 facilitates the servicing of a support shaft having a height substantially equal to the combined height of the housing sections 12 and the extension 120 in that the support shaft 97 is insertable through the housing sections 12 and through the extension 120.

It is to be understood that the embodiments of the invention described are merely illustrative of the application of the principles of this invention. Reference herein to the details of the illustrated embodiment is not intended to limit the scope of the claims which themselves recite those features regarded as essential to the invention.

I claim:

1. An apparatus for use in removing a bearing from its support mounting, said apparatus comprising:

a housing configured to be hollow and positionable about a bearing to be removed, to form a barrier enclosure about said bearing for protecting a user against fragments of said bearing which explodes during a removal thereof from its support mounting, said housing including a lip extension detachably mounted thereon adapted to be inserted beneath and engage an outer race of said bearing; and a drive means displaceably mounted on said housing, for applying a disengagement force against a support mounting of said bearing;

wherein an application of said disengagement force against said support mounting causes said housing to be displaced vis-a-vis said support mounting, thereby displacing said bearing from its mounting due to said lip's engagement with said outer race.

2. The apparatus of claim 1, wherein said housing comprises:

a platform; and a plurality of housing sections pivotedly mounted to said platform;

wherein an upper end of at least one said housing section is pivotally mounted to said platform to thereby permit a lower end of said housing to be rotatable outwardly away from an opposing housing section, thereby opening said housing to receive said bearing and its said support mounting.

3. The apparatus of claim 1, wherein said platform includes a plurality of outwardly extending pins mounted thereon, each said pin being received within a respective slot defined within at least one of said housing sections, an association of said pins with said slots defining a pivot axis for said housing sections.

4. The apparatus of claim 2, wherein said housing sections are detachably mounted to said platform.

5. The apparatus of claim 1, wherein each said housing section includes a detachable lip configured to engage a bearing to be removed.

6. An apparatus for removing a bearing from its support mounting, said apparatus comprising:

a first sleeve half and a second sleeve half positioned longitudinally adjacent one another to form a hollow, substantially enclosed sleeve unit, said first sleeve half and said second sleeve half each having an upper end and a lower end, said lower end of each sleeve half defining an engagement lip configured to engage a circumference of an outer race of a bearing, said upper end of each sleeve half defining a pair of slots therein; wherein said first sleeve half includes tabs mounted thereon to project outwardly therefrom to engage with said second sleeve half when said sleeve halves are joined as a unit, said tabs functioning to reduce lateral movement of said sleeve halves in relation to one another;

a platform having pins extending outwardly therefrom, positioned between said first sleeve half and said second sleeve half said pins engaging with said slots of said first sleeve half and said second sleeve half to form pivot axes for said sleeve halves about said platform, said platform having a central aperture therethrough;

a drive shaft inserted through said aperture of said platform and engaging said platform, said drive shalt being adapted for apply a force against said bearing support mounting; and a retention means for retaining said sleeve halves in engagement one with another.

7. The apparatus of claim 6, wherein said retention means comprises a substantially inflexible annular collar slidably disposed about said sleeve unit.

8. The apparatus of claim 5, wherein the lower end of said first sleeve half and of said second sleeve half are formed with an outwardly projecting second lip against which said substantially inflexible collar may rest when placed about said sleeve unit.

9. The apparatus of claim 6 in which one of said sleeve halves defines a window therethrough for viewing an engagement of said drive shaft with said support shaft, permitting an alignment thereof one with another.

10. An apparatus for removing a bearing from a support shaft, said apparatus comprising:

a first housing section and a second housing section positioned longitudinally adjacent one another to form a sleeve unit, said first housing section and said second housing section each having an upper end and a lower end, said lower end of each housing section having an inwardly extending lip configured for engagement with the outer race of a bearing, said upper end of each sleeve defining a pair of slots therein;

an extension which is hollow, elongate and cylindrical in configuration having a substantially closed upper end and having a central aperture defined in said closed upper end said extension defining an elongate internal channel which extends between said aperture and an open lower end, said extension having pins extending laterally from said exterior sidewall proximate said lower end, each said pin engaging with a respective said slot of one of said housing sections; and a drive means removably inserted through said aperture of said hollow extension for engaging a support shaft of said bearing to be removed;

wherein said channel is dimensioned to receive said support shaft therein throughout the length thereof.

11. The apparatus of claim 10, wherein said sleeve unit defines an elongate window therein for viewing a placement of said drive shaft on said support shaft.

12. The apparatus of claim 11, wherein an inflexible collar is slidably disposed about the circumference of said substantially cylindrical sleeve unit proximate said lower ends of said sleeves.

13. The apparatus of claim 10, wherein each said lip is adapted to be detachably removed from its respective housing section.

14. The apparatus of claim 6 wherein each said engagement lip is detachably mounted to its respective sleeve.

15. An apparatus for removing a bearing from its support mounting, said apparatus comprising:

a first sleeve half and a second sleeve half positioned longitudinally adjacent one another to form a hollow, substantially enclosed sleeve unit, said first sleeve half and said second sleeve half each having an upper end and a lower end, said lower end of each sleeve half defining an engagement lip configured to engage a circumference of an outer race of a bearing, each sleeve half defining an aperture therein;

a platform positioned between said first sleeve half and said second sleeve half, said sleeve halves being pivotedly mounted on said platform for rotation about a pivot axis, said platform having a central aperture therethrough;

two pins mounted on said platform, said pins being oriented orthogonal to said pivot axis of at least one of said sleeve halves; each said pin being configured to be received within a respective said aperture within a respective said sleeve half to retain said respective sleeve half in position during an operation of said apparatus;

a drive shaft inserted through said aperture of said platform and engaging said platform, said drive shaft being adapted for applying a force against said bearing support mounting;

a retention means for retaining said sleeve halves in engagement one with another; and wherein an application of said force against said support mounting causes said housing to be displaced vis-a-vis said support mounting thereby displacing said bearing from its mounting due to said lips engagement with said outer race.

* * * * *